L. C. HILL.
MACHINE FOR EXTERMINATING INSECTS.
APPLICATION FILED AUG. 17, 1910.
996,337.
Patented June 27, 1911.
2 SHEETS—SHEET 1.
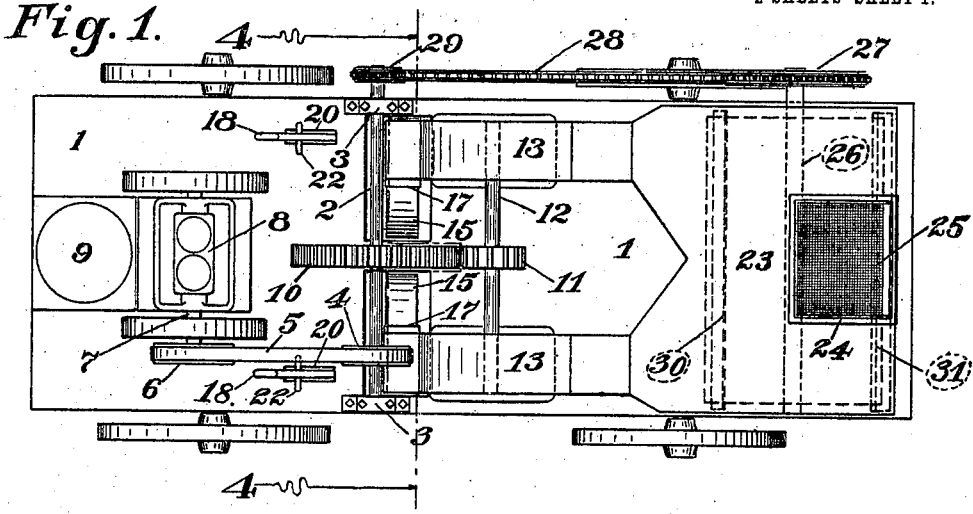
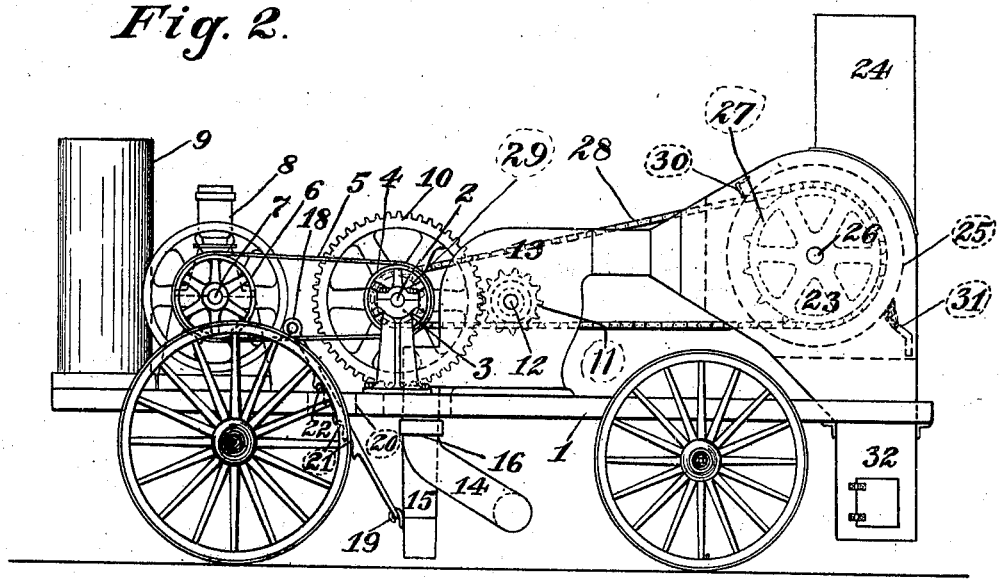

L. C. HILL.
MACHINE FOR EXTERMINATING INSECTS.
APPLICATION FILED AUG. 17, 1910.

996,337.

Patented June 27, 1911.

2 SHEETS—SHEET 2.

Witnesses:
George G. Anderson
Harry N. Peiss

Inventor:
Leonidas C. Hill,
By Hugh K. Wagner,
His Attorney.

UNITED STATES PATENT OFFICE.

LEONIDAS C. HILL, OF HARLINGEN, TEXAS.

MACHINE FOR EXTERMINATING INSECTS.

996,337. Specification of Letters Patent. Patented June 27, 1911.

Application filed August 17, 1910. Serial No. 577,603.

*To all whom it may concern:*

Be it known that I, LEONIDAS C. HILL, a citizen of the United States, residing at Harlingen, in the county of Cameron and State of Texas, have invented certain new and useful Improvements in Machines for Exterminating Insects, of which the following is a specification.

This invention consists of an apparatus for collecting insects, such as the boll weevil, the potato bug and other varieties of insects, or the like, detrimental to vegetable or animal life or, for any other reason, obnoxious.

One of the objects of the present invention is to provide pneumatic suction that is adapted to collect the insects and their larvæ from the area to be freed of the insects.

Another feature of this invention resides in the provision of means for killing or destroying the collected insects and their larvæ.

Figure 3:
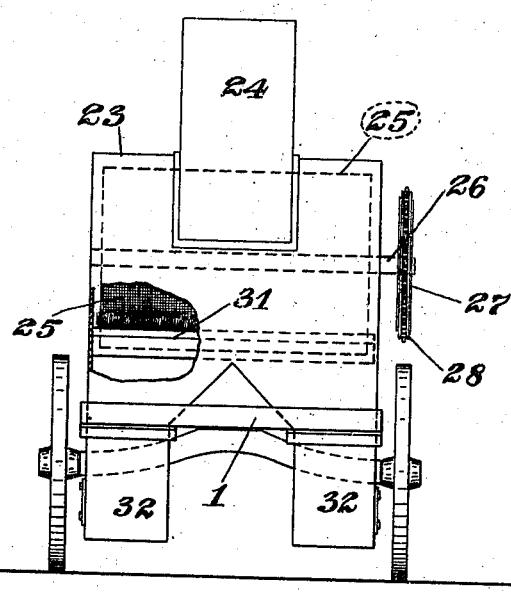
Figure 4:
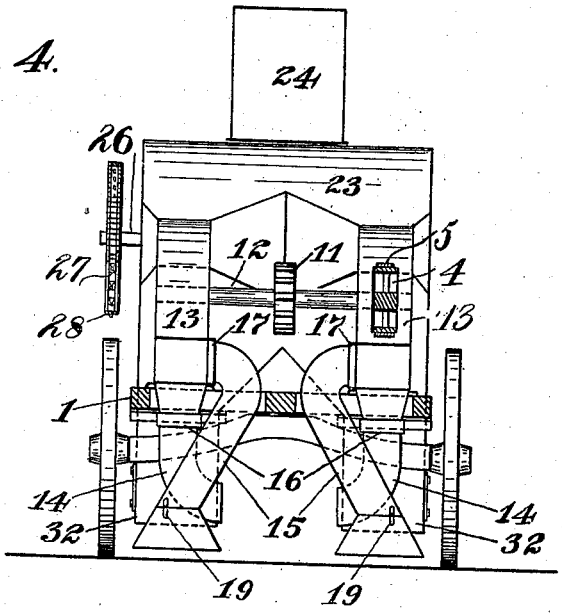

In the accompanying drawings forming part of this specification, in which like numbers of reference denote like parts wherever they occur, Figure 1 is a top plan view of an apparatus embodying this invention; Fig. 2 is a side elevation of same; Fig. 3 is an end elevation; and Fig. 4 is a sectional view on the line 4—4, Fig. 1.

The parts of the apparatus are supported on the bed of a suitable vehicle 1. Said vehicle can be drawn by a horse or horses or, if desired, can be driven with motive power. The drive shaft 2 is journaled in suitable supports 3. A pulley 4 is rigidly mounted on shaft 2 and is driven by belt 5 that receives its power from a band-wheel 6 on shaft 7 of an engine 8. Said engine can be a gasolene, gas, or any other type of engine or, if desired, an electric motor, or the like, can be utilized, and, when a gas or gasolene engine is used a water tank 9 is provided therefor. Shaft 2 bears a gear 10 that meshes with and drives a gear 11 on shaft 12 of a suction-fan or fans 13.

In the drawings a pair of suction-fans 13 is depicted, but it should be understood that one fan can be substituted therefor or, in case of necessity, three or more fans can be utilized.

Each fan 13 is provided with an intake spout 14 and, also, with an intake spout 15. The spout 14 is rotatably attached at 16 to the casing of fan 13 so that same can be swung into position to allow its mouth to travel adjacent the plants with the result that the insects and their larvæ upon the plants are drawn through said spout into said fan. The spout 15 is revolubly connected at 17 to the casing of fan 13 in order that same may be raised or lowered. Said spout 15 is arranged so that its mouth moves adjacent the ground near the plants, whereby the insects and their larvæ upon the ground are drawn through said spout into said fan. A bar 18 or other suitable means is attached to hook 19 borne by spout 15, and affords a means for raising or lowering said spout. Said bar 18 passes through an opening 20 in the bed of the vehicle 1 and contains a plurality of notches 21, a member 22 being arranged so that any one of said notches can be hooked thereon to hold spout 15 in any desired position.

Each fan 13 is connected to a casing 23 in order to exhaust the insects and their larvæ into the interior of said casing. Said casing supports a vent stack 24, which allows the air to escape from the interior of same, and contains a drum 25 that is mounted on shaft 26 journaled in the ends of said casing. One end of shaft 26 projects from casing 23 and bears a sprocket 27 that is driven by chain 28, said chain being driven by means of a sprocket 29 on drive shaft 2. Drum 25 is arranged between the vent stack 24 and the connections between casing 23 and fan 13 and is preferably formed of wire screen, or the like, so that the air that discharges into the interior of casing 23 from fans 13 is caused to pass through the screen drum before escaping through stack 24. By this arrangement the insects and their larvæ that are exhausted from fans 13 into the interior of casing 23 are forced against the screen drum 25 and held thereagainst by the suction of the air passing through said screen drum, whereby the insects and their larvæ are caused to rotate with said drum. A shield 30 is arranged adjacent one side of drum 25 in order to prevent the insects and their larvæ from escaping around said drum into stack 24. A brush 31 that is preferably provided with wire bristles is arranged adjacent the other side of drum 25 so that the bristles engage said drum, and as said drum rotates counter-clockwise, Fig. 2, the brush 31 causes the insects and their larvæ to drop from said drum into a fire-chamber 32, or a plurality of such fire-chambers, arranged beneath said drum, whereby the insects and their larvæ are destroyed by fire.

While the insects and their larvæ are destroyed by burning same in the fire-chambers 32, yet it should be understood that other suitable means for destroying or killing same can be substituted for said fire-chambers without departing from the nature and spirit of this invention, such, for example, as rollers adapted to crush the insects and their larvæ, chemical baths, electrical means, etc.

The operation of the apparatus is as follows: The engine 8 is set into operation with the result that drive shaft 2 is caused to rotate and to drive fans 13 and drum 25 as hereinabove described, and the vehicle 1 is moved either toward the right or left, Fig. 2. When the apparatus is to be used to remove the insects and their larvæ from plants, such as cotton plants, etc., and, also, from the ground adjacent the plants, the vehicle 1 is moved along a row of plants so that the bed of same moves longitudinally over the row of plants. The spouts 14 are swung into position so that their mouths move along the sides of the row of plants, and the spouts 15 are lowered into position to allow their mouths to move along the ground on both sides of the row of plants, with the result that the insects and their larvæ upon the plants and upon the ground adjacent the plants are drawn into said spouts 14 and 15 by the suction of fans 13 and are then exhausted by said fans into the interior of casing 23. The insects and larvæ that enter the interior of casing 23 are forced into engagement with drum 25 and held thereagainst, as hereinabove described, until the brush 31 causes same to fall into fire-chambers 32 in which same are consumed.

I claim:

1. In an apparatus of the character described, the combination of a suction-fan, means connected thereto for collecting insects and their larvæ, a casing connected to said fan and having an exhaust port, a death chamber connected to said casing, a cylindrical screen rotatably mounted within said casing and arranged to prevent the collected insects and larvæ from escaping through said exhaust port, and means for killing the collected insects in said death chamber.

2. In an apparatus of the character described, the combination of a suction-fan, means connected thereto for collecting insects and their larvæ, a casing connected to said fan and having an exhaust port, a death chamber connected to said casing, a cylindrical screen rotatably mounted within said casing and arranged to prevent the collected insects and larvæ from escaping through said exhaust port, means for removing the collected insects and larvæ from said screen so that same fall into said death chamber, and means for killing the collected insects and larvæ in said death chamber.

3. In an apparatus of the character described, the combination of a suction-fan, means connected thereto for collecting the insects and their larvæ, a casing connected to said fan and having an exhaust port, a death chamber connected to said casing, a cylindrical screen rotatably mounted within said casing and arranged to prevent the collected insects and larvæ from escaping through said exhaust port, means to prevent the collected insects and larvæ from passing around said screen, means for removing the collected insects and larvæ from said screen and causing same to fall into said death chamber, and means for killing the collected insects and larvæ in said death chamber.

4. In a machine for exterminating insects, in combination with means to collect the insects, a casing communicating with said means, a death chamber connected to the casing, a cylindrical member in the casing, means to force the insects against the periphery of said cylindrical member, means to rotate said member, and means to dislodge the insects from the periphery of said member to allow same to drop into the death chamber.

5. In a machine for exterminating insects, a casing, a death chamber connected thereto, a drum in said casing, suction means for collecting the insects and for forcing the same into said casing, and against said drum periphery and means for dislodging the insects from the drum periphery to allow same to gravitate into the death chamber.

6. In a machine for exterminating insects, in combination with a casing having an outlet at its upper end and a death chamber at its lower end, a movable foraminous element in the casing operating between said outlet and chamber and extending across the upper end of the latter, suction means for collecting the insects and for forcing same against said element to normally hold same in contact therewith, means located above said chamber to engage said element to dislodge the insects therefrom, and means to impart movement to said element.

7. In a machine for exterminating insects, in combination with a casing having an outlet and a death chamber connected thereto, a foraminous drum in the casing between the outlet and chamber to prevent the insects from entering the outlet, vacuum means to collect the insects and to force same against said drum, a shield between the drum and casing, means to dislodge the insects from the drum to allow same to enter the chamber, and means to rotate the drum.

8. In a machine for exterminating insects, in combination with a casing having a death chamber connected thereto, rotatable means in the casing to receive the insects on its exterior, suction means to collect the insects and to force same against said means, means to drive said rotatable means, and means overlying the death chamber to engage the exterior of said rotatable means to dislodge the insects and allow same to enter said chamber.

9. In a machine for exterminating insects, in combination with a casing having a stack at one end with a death chamber underlying the stack and disposed at the bottom of the casing, a rotatable foraminous drum in the casing below the bottom end of the stack, a shield carried by the casing and engaging the drum to prevent the insects entering the stack, a brush also carried by the casing and engaging the drum at points overlying the death chamber whereby the insects are dislodged from the drum and gravitate into said chamber, a suction fan communicating with the casing, means to drive the suction fan, and means operated by the suction fan driving means to rotate said drum.

In testimony whereof I have hereunto affixed my signature in the presence of two witnesses.

LEONIDAS C. HILL.

Witnesses:
  GEORGE G. ANDERSON,
  GLADYS WALTON.

Copies of this patent may be obtained for five cents each, by addressing the "Commissioner of Patents, Washington, D. C."